United States Patent
Tsai

(10) Patent No.: US 8,217,135 B2
(45) Date of Patent: Jul. 10, 2012

(54) PURIFICATION METHOD OF POLYAMIC ACID RESIN AND POLYIMIDE RESIN

(75) Inventor: Min-Ruei Tsai, Kaohsiung (TW)

(73) Assignee: Daxin Materials Corporation, Taichung (TW)

( * ) Notice: Subject to any disclaimer, the term of this patent is extended or adjusted under 35 U.S.C. 154(b) by 0 days.

(21) Appl. No.: 12/982,787

(22) Filed: Dec. 30, 2010

(65) Prior Publication Data

US 2011/0160423 A1 Jun. 30, 2011

(30) Foreign Application Priority Data

Dec. 31, 2009 (TW) .............................. 98146379 A

(51) Int. Cl.
*C08G 63/00* (2006.01)
*C08G 63/02* (2006.01)

(52) U.S. Cl. .................... 528/289; 528/481; 528/482

(58) Field of Classification Search .................. 528/289, 528/481, 482
See application file for complete search history.

(56) References Cited

U.S. PATENT DOCUMENTS

| 4,307,220 A | 12/1981 | Lucarelli et al. |
| 5,133,840 A * | 7/1992 | Buchwalter et al. .......... 205/167 |
| 5,674,662 A | 10/1997 | Szmanda et al. |
| 6,623,644 B2 | 9/2003 | Bruening et al. |
| 7,138,485 B2 | 11/2006 | Goerlitzer et al. |

* cited by examiner

*Primary Examiner* — Terressa Boykin
(74) *Attorney, Agent, or Firm* — Jianq Chyun IP Office

(57) ABSTRACT

Purification methods of polyamic acid resin and polyimide resin are provided. The purification methods of polyamic acid resin or polyimide resin includes providing a polyamic acid resin or a polyimide resin containing metal ion impurities. Thereafter, a cation exchange resin is used to react with the polyamic acid resin or the polyimide resin in order to remove the metal ion impurities therein, and a water content in the polyamic acid resin or the polyimide resin is removed to purify the polyamic acid resin or polyimide resin.

25 Claims, 2 Drawing Sheets

PURIFICATION METHOD OF POLYAMIC ACID RESIN AND POLYIMIDE RESIN

CROSS-REFERENCE TO RELATED APPLICATION

This application claims the priority benefit of Taiwan application serial no. 98146379, filed on Dec. 31, 2009. The entirety of the above-mentioned patent application is hereby incorporated by reference herein and made a part of this specification.

BACKGROUND OF THE INVENTION

1. Field of the Invention

The present invention is related to a purification method of a resin solution, and in particular to a purification method of a polyamic acid (PAA) resin and a polyimide resin.

2. Description of Related Art

Performance of electronic material products at the application end often determines the quality and performance of devices, so that compared with materials of general use, electronic materials having greater threshold requirements in purity and quality. In order to satisfy requirements of the end products, in synthesis of electronic material, polymerization of various kinds of starting material or formulae having different materials added is used, so that if purity monitoring is performed on the most initial starting materials, variations in qualities of the electronic materials are reduced.

Taking polyimide (PI) and polyamic acid (PAA) for example, they are widely used as electronic materials. PI is used in electronic products such as liquid crystal displays (LCD), integrated circuits (IC), and flexible copper clad laminates (FCCL). For applications in different products, there are different requirements on polyimide and polyamic acid. In addition to the different requirements, however, there are common requirements for various applications in both the metal ion contents and water contents in polyimide and polyamic acid, since these two factors directly affect the performances of the end products.

For example, when polyimide or polyamic acid is used in orientation films, it is required that the metal ion content therein is low. Nonetheless, the main functional groups in the compositions of resin solutions are amino groups, imide groups, amide groups, and/or acidic groups, which have chelating forces on the metal ions. In addition, the solvents (such as 1-methyl-2-pyrrolidone, cyclobutyrolactone, butyl carbitol (BC), ethyl carbonate (EC), and dimethylacetamide (DMAc)) which are used also have chelating abilities. Hence, after the resin solution is used, the metal ion impurities contained therein are often excessive, which calls for further purification. Moreover, in the application of orientation films, polyimide or polyamic acid requires low water content, in consideration of its effect on planarity and uniformity of the film surface during coating. Hence if the water content increases during production or after use, the water content needs to be reduced.

In current purification of polyimide or polyamic acid, precipitation is the mainly used method. This method is to remove polymers or monomers in the solution which have smaller molecular weights, thereby narrowing the distribution of molecular weights. During the processes, the metal ions are simultaneously washed out, so as to achieve purification effects.

This precipitation method, however, is complex in processes, and a great amount of the solvents is consumed therein for industrial use, which leads to further problems of subsequent waste solution. In light of the above, if a purification method with simplified processes and reduced solvent consumption is offered, there would be great benefit in both practical applications and environmental protection.

SUMMARY OF THE INVENTION

The present invention is directed to a purification method of polyamic acid resin and polyimide resin. In particular, the purification method in this invention allows effective removal of water content and metal ions impurities in resin solutions with simplified processes and reduced solvent consumption.

The invention provides a purification method of polyamic acid resin, which includes providing a polyamic acid resin containing metal ion impurities, and performing a metal ion removal step and a water content removal step. In the metal ion removal step, a cation exchange resin is used to react with the polyamic acid resin to remove the metal ion impurities therein, and the water content removal step is used to remove the water content in the polyamic acid resin, so as to purify the polyamic acid resin. The metal ion removal step can be performed prior or later to the water content removal step in the order of sequence.

The present invention further provides a purification method of polyimide resin, which includes providing a polyimide resin containing metal ion impurities, and performing a metal ion removal step and a water content removal step. In the metal ion removal step, a cation exchange resin is used to react with the polyimide resin to remove the metal ion impurities therein, and the water content removal step is used to remove the water content in the polyimide resin, so as to purify the polyimide resin. The metal ion removal step can be performed prior or later to the water content removal step in the order of sequence.

According to embodiments of this invention, the main chain of the cation exchange resin may be selected from polystyrene, polydiphenylethylene, or a polymer formed by polymerization or crosslinking of silicone.

According to embodiments of this invention, the cation exchange resin has at least one of the following functional groups: a sulfone group, an amino salt group, an acidic group, a polyol group, or a urea group.

According to embodiments of this invention, the reaction flow rate of the metal ion removal step is between 10 and 300 L/h.

According to embodiments of this invention, the temperature of the metal ion removal step is between 0 and 75° C.

According to embodiments of this invention, the pressure of the metal ion removal step is between 0 and 10 kg/m$^2$.

According to embodiments of this invention, the pH value of the metal ion removal step is between 4 and 10.

According to embodiments of this invention, the water content removal step includes using a molecular sieve, celite, or aluminum oxide.

According to embodiments of this invention, the water content removal step includes performing processes of evaporation, freeze sublimate, molecular sieve absorption, celite absorption, or aluminum oxide absorption.

According to embodiments of this invention, the water content removal step includes performing thin film evaporation.

According to embodiments of this invention, a reaction time of the water content removal step is 4-12 hours.

According to embodiments of this invention, the temperature of the water content removal step is between −5 and 75° C.

According to embodiments of this invention, the pressure of the water content removal step is between 0.01 and 30 torr.

According to the above description, the present invention provides the method, in which physical processes are utilized to remove the water content and metal ion impurities in the polyamic acid resin or polyimide resin solution newly produced or after used, allowing effective purification of a polyamic acid resin and a polyimide resin. In addition, compared with conventional purification methods, the present invention provides the purification method with simplified processes and reduced solvent consumption.

In order to make the aforementioned and other features and advantages of this invention more comprehensible, several embodiments accompanied with figures are described in detail below.

BRIEF DESCRIPTION OF THE DRAWINGS

The accompanying drawings are included to provide a further understanding of this invention, and are incorporated in and constitute a part of this specification. The drawings illustrate embodiments of the application and, together with the description, serve to explain the principles of this invention.

DESCRIPTION OF EMBODIMENTS

Figure 1:
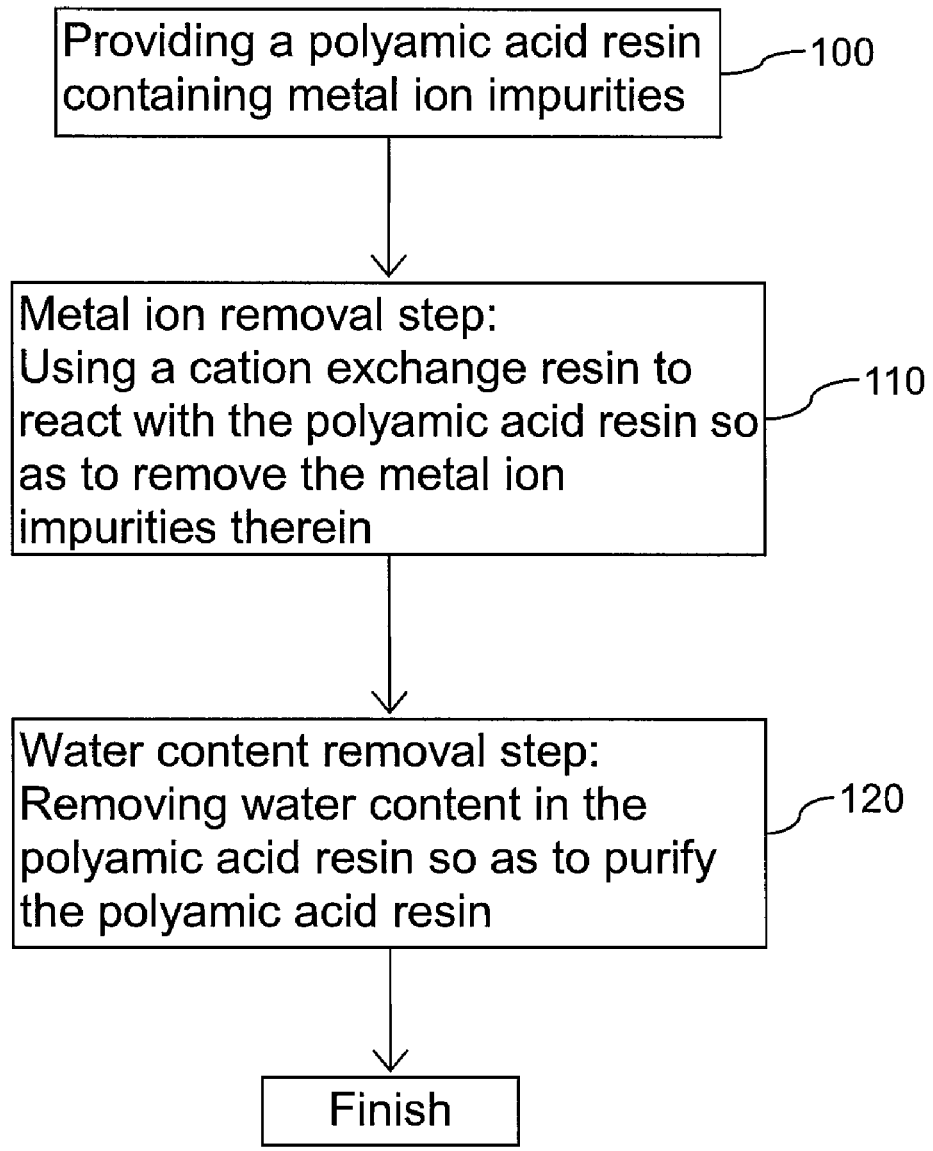
FIG. 1 is a flowchart showing a purification method of a polyamic acid resin according to the first embodiment of the invention.

FIG. 1 is a flowchart showing a purification method of a polyamic acid resin according to the first embodiment of the invention. In a step 100, a polyamic acid resin containing metal ion impurities is provided. The polyamic acid resin may be a polyamic acid resin solution newly produced, or may be a polyamic acid resin solution recycled after used, and solvents such as 1-methyl-2-pyrrolidone, butyl carbitol (BC) may be included therein.

Then, a step 110 is performed, which is a metal ion removal step. In this step, a cation exchange resin is used to react with the polyamic acid resin solution to remove the metal ion impurities therein. For example, the above cation exchange resin may first be filled into a pressurized filtering container, and the polyamic acid resin solution is passed through the pressurized container by an inert gas with a pressure of 0-10 kg/m2, so as to obtain a filtrate. The filtrate is the polyamic acid resin solution after removal of the metal ion impurities. In the metal ion removal step, the reaction flow rate is, for example, between 10 and 300 L/h, preferably between 30 and 120 L/h; the temperature is, for example, between 0 and 75° C., preferably between 5 and 25° C.; the pressure is, for example, between 0 and 10 kg/m2, preferably between 2 and 4 kg/m2; and the pH value is, for example, between 4 and 10.

In addition, in step 110, according to actual characteristics and numbers of the functional groups of the polyamic acid resin and the solvent environment in the polyamic acid resin solution, a cation exchange resin resistant to high polarity solvents may be used as the main ion-removing reagent. Anion exchange resins are not used in the present invention, for anion exchange resins are mainly primary, secondary, tertiary, or quarternary amine salts, which are the functional groups having higher reactivity and may also react with amide group of the polyamic acid resin solution.

In the present invention, any kind of cation exchange resin may be used to remove the metal ion impurities in the polyamic acid resin solution. The more suitable choices are the cation exchange resins having at least one of the following functional groups: a sulfone group, an amino salt group, an acidic group, a polyol group, or a urea group. Alternatively, the main chain of the cation exchange resin may be selected from polystyrene, polydiphenylethylene, or a polymer formed by polymerization or crosslinking of silicone. The main manufacturers are, for example, DOW CHEMICAL, ROHM AND HAAS, and SILICYCLE, and the cation exchange resins that may be used are, for example, a) SILIABOND®, b) DOWEX®, c) AMBERLYST®, d) CELITE®, and e) TONSIL.

A further addition of polyamide ligand containing reagents and/or cycling between precipitation and filtering, which are beneficial to removal of the metal ion impurities, may also be included in the step 110.

Then, a step 120 is performed, which is a water content removal step. In this step, water content in the above polyamic acid resin solution is removed, so as to purify the polyamic acid resin solution. According to the first embodiment, in the water content removal step, the reaction time is between 4 to 12 hours; the temperature is between −5 and 75° C., preferably between 10 and 65° C.; and the pressure is between 0.01 and 30 torr.

Moreover, in the step 120, a molecular sieve, celite, or aluminum oxide may be used to remove the water content. For example, in the step 120, processes of evaporation, freeze sublimate, molecular sieve absorption, celite absorption, or aluminum oxide absorption may be performed on the polyamic acid resin solution. In addition, since the organic solvents used by the resin have higher boiling temperatures, and the polymer materials decompose under high temperatures, pressure is lowered when performing the step 120 to facilitate distillation of the water content. Hence, besides common evaporation, a more suitable method may be used in the step 120, i.e. performing thin film evaporation on the polyamic acid resin solution, by using, for example, a continuous thin film evaporator. In the above thin film evaporation process, for example, the reaction flow rate is between 1 and 30 L/h; the temperature is between 0 and 75° C.; the evaporation time is between 10 and 600 seconds; and the pressure is between 0.01 and 30 torr, so as to avoid the deterioration of polyamic acid resin caused by high temperature during the thin film evaporation process.

With different arrangements of the order of the two main steps, different degree of purification of polyamic acid resin solution can be achieved. Optimally, the water content and the amount of metal ions in the polyamic acid resin solution can be respectively lowered to below 0.1% and 1 ppm. Moreover, persons having ordinary skills in the art may arrange the optimal purification system according to different requirements at the application end, and then configure the optimal purification conditions according to standards in this system.

Figure 2:
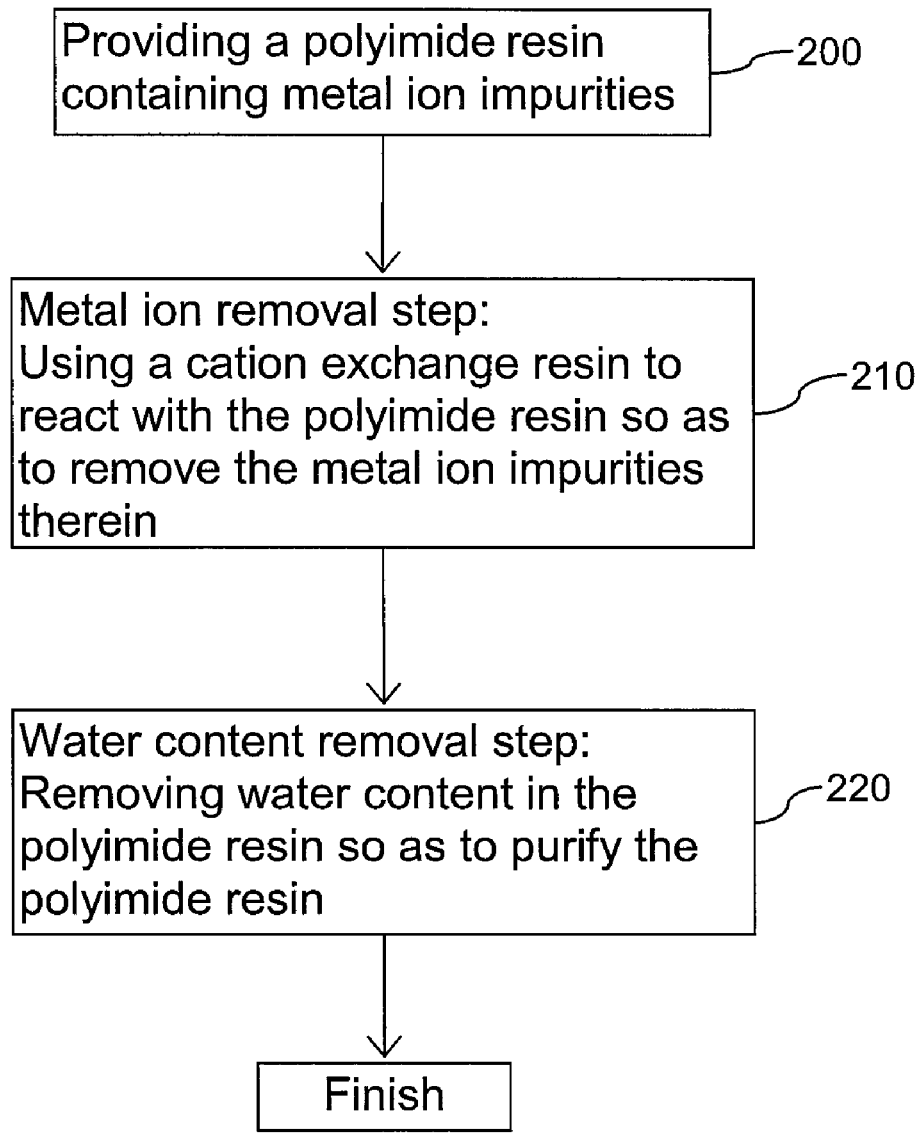
FIG. 2 is a flowchart showing a purification method of a polyimide (PI) resin according to the second embodiment of the invention.

FIG. 2 is a flowchart showing a purification method of a polyimide (PI) resin according to the second embodiment of the invention. In a step 200, a polyimide resin containing metal ion impurities is provided. The polyimide resin may be a polyimide resin solution newly produced, or may be a polyimide resin solution recycled after used, and solvents such as 1-methyl-2-pyrrolidone, butyl carbitol (BC) may be included therein.

Then, a step 210 is performed, which is a metal ion removal step. In this step, a cation exchange resin is used to react with the polyimide resin solution to remove the metal ion impurities therein. The detailed examples are as described in the first embodiment. In the above metal ion removal step, the reaction flow rate is, for example, between 30 and 120 L/h; the temperature is, for example, between 0 and 75° C.; the pressure is, for example, between 0 and 10 kg/m2; and the pH value is, for example, between 4 and 10. In the step 210, any kind of cation exchange resin may be used to remove the metal ion impurities in the polyimide resin solution, wherein the more suitable cation exchange resins are as described in the first embodiment. In addition, a further addition of polyamide ligand containing reagents and/or cycling between precipitation and filtering, which are beneficial to removal of the metal ion impurities, may also be included in the step 210.

Then, a step 220 is perfoi ned, which is a water content removal step. In this step, water content in the above polyimide resin solution is removed, so as to purify the polyimide resin solution. According to the second embodiment, in the water content removal step, the reaction time is between 4 to 12 hours, the temperature is between −5 and 75° C., and the pressure is between 0.01 and 30 ton, for example. Moreover, the techniques in step 110 described in the first embodiment, such as using the continuous thin film evaporator, may also be used in the step 220.

With different arrangements of the above steps 210 and 220, different degree of purification of the polyimide resin solution can be achieved. Optimally, the water content and the amount of metal ions in the polyimide resin solution are respectively lowered to below 0.1% and 1 ppm. Moreover, persons having ordinary skills in the art may arrange the optimal purification system according to different requirements at the application end, and then configure the optimal purification conditions according to standards in this system.

The following exemplify a plurality of experiments to demonstrate efficacy of the invention.

Experiments

Experimental Embodiment 1

The PI resin (or PAA resin) containing the metal ion impurities are mixed with the ion exchange resin (DOWEX 50W SERIES®; DOWEX MONOSPHERE SERIES®; DOWEX MARATHON®; AMBERJET®; AMBERLITE SERIES®; AMBERLYST SERIES®) and evenly stirred, wherein the ratio of ion exchanger resin to PI (or PAA) resin is between 1 and 50 wt % and a mixing temperature is between 15 and 20° C., so that the PI resin and the ion exchange resin are thoroughly mixed. Next, under a pressure of 2 kg/m², an inert gas is used to push the above mixture through a 300 mesh filter board, so that the ion exchange resin and the PI resin are separated. Then, at a temperature between 15 and 65° C. and under a pressure between 0.1 and 5 torr, the PI resin is added into a reactor for vacuum distillation. Measurement of water content is performed every 4 hours until the water content is below 0.1%.

Experimental Embodiment 2

The PI resin (or PAA resin) containing the metal ion impurities are mixed with the ion exchange resin (DOWEX 50W SERIES®; DOWEX MONOSPHERE SERIES®; DOWEX MARATHON®; AMBERJET®; AMBERLITE SERIES®; AMBERLYST SERIES®) and evenly stirred, wherein the ratio of ion exchanger resin to PI (or PAA) resin is between 50 and 80 wt % and a mixing temperature is between 20 and 25° C., so that the PI resin and the ion exchange resin are thoroughly mixed. Next, under a pressure of 2 kg/m², an inert gas is used to push the above mixture through a 300 mesh filter board, and the ion exchange resin and the PI resin are so separated. Then the PI resin is added into a thin film evaporator for concentration at a speed of 150 revolutions per minute (rpm) and a temperature between 0 and 65° C. and under a pressure between 0.01 and 2 torr. Measurement of water content is performed each time the PI resin is passed through the device, and if a standard is not met, the PI resin is repeatedly added into the thin film evaporator until the water content is below 0.1%.

Experimental Embodiment 3

The ion exchange resin (DOWEX 50W SERIES®; DOWEX MONOSPHERE SERIES®; DOWEX MARATHON®; AMBERJET®; AMBERLITE SERIES®; AMBERLYST SERIES®) is mixed at a temperature between 20 and 25° C. and filled into a bottom of a pressure-resistant container which is supported by a 300 mesh filter board to form a filling tower. The PI resin (or PAA resin) containing metal ion impurities is passed through the filling tower by using nitrogen under a pressure between 2 and 4 kg/m² and is thoroughly mixed with the ion exchange resin at a flow rate between 30 and 120 L/h. Then, at a temperature between 15 and 65° C. and under a pressure between 0.1 and 5 torr, the PI resin is added into a reactor for vacuum distillation. Measurement of water content is performed every 4 hours until the water content is below 0.1%.

Experimental Embodiment 4

The ion exchange resin (DOWEX 50W SERIES®; DOWEX MONOSPHERE SERIES®; DOWEX MARATHON®; AMBERJET®; AMBERLITE SERIES®; AMBERLYST SERIES®) is mixed at a temperature between 20 and 25° C. and filled into a bottom of a pressure-resistant container which is supported by a 300 mesh filter board to form a filling tower. The PI resin containing metal ion impurities is passed through a filling tower by using nitrogen under a pressure between 2 and 4 kg/m² and is thoroughly mixed with the ion exchange resin at a flow rate of 30 to 120 L/h. Then the PI resin (or PAA resin) is added into a thin film evaporator for concentration at a speed of 150 rpm and a temperature between 0 and 65° C. and under a pressure between 0.01 and 2 torr. Measurement of water content is performed each time the PI resin is passed through the device, and if a standard is not met, the PI resin is repeatedly added into the thin film evaporator until the water content is below 0.1%.

Comparative Embodiment

The PI resin (or PAA resin) solution which is not filtered is added into ethanol absent of water at a ratio between 5 and 10 wt % for precipitation, and passed through a 300 mesh filter film to separate the solid and liquid, the solid is vacuum-dried under a pressure between 0.001 and 0.01 torr and re-dissolved in a mixed solvent having between 50 and 55 wt % 1-methyl-2-pyrrolidone and BC.

Testing

For the above Experimental Embodiments 1 to 4 and the Comparative Embodiment, optoelectronic characteristics and resin characteristics are measured, wherein the optoelectronic measuring instruments and resin measuring instruments are shown in the following Table 1.

TABLE 1

| Optoelectronic characteristic | Instrument manufacturer and model number | Resin characteristic | Instrument manufacturer and model number |
|---|---|---|---|
| Pre-tilt angle (PTA) | AUTRONIC TBA 107 ® | Viscosity | TOKI SANGYO, TV-22 ® |
| VHR | TOYO 6254 ® | Non-volatile content | ACE DRAGON H-72 ® |
| RDC | | Water content | METROHM 784 KFP TITRINO ® |
| | | ICP-Ms | PERKINELMER ELAN DRC II ® |
| | | GC | PERKINELMER CLARUS 600 ® |
| | | IR | PERKINELMER SPECTRUM ONE ® |

Analysis and comparison between PI resin (or PAA resin) characteristics before and after purification are shown in the following Table 2. In Table 2, the changes in viscosity of the PI resin before and after purification in the invention are clearly shown. In particular, the amount of the metal ions in the PI resin (or PAA resin) after purification, as measured by an inductively coupled plasma mass spectrometer (ICP-Ms), is much lower than that in the Comparative Embodiment

TABLE 2

| Number of Experimental Embodiment | Viscosity (cps) | Non-volatile content (wt %) | Water content (ppm) | ICP-Ms (ppb) |
|---|---|---|---|---|
| Experimental Embodiment 1 (before) | 26 | 7.9 | 89745 | 8021 |
| Experimental Embodiment 1 (after) | 17.9 | 7.5 | 961 | 132 |
| Experimental Embodiment 2 (before) | 35 | 8.2 | 132546 | 652 |
| Experimental Embodiment 2 (after) | 17.5 | 7.6 | 526 | 159 |
| Experimental Embodiment 3 (before) | 32 | 8.1 | 120365 | 269 |
| Experimental Embodiment 3 (after) | 17.8 | 7.5 | 724 | 89 |
| Experimental Embodiment 4 (before) | 36 | 8.4 | 150689 | 129 |
| Experimental Embodiment 4 (after) | 17.6 | 7.6 | 652 | 28 |
| Comparative Embodiment (before) | 26 | 7.9 | 79845 | 425 |
| Comparative Embodiment (after) | 30 | 7.6 | 680 | 369 |

Application evaluation results of the PI resin (or PAA resin) after purification are shown in the following Table 3. As known from Table 3, the RDC values of the PI resins obtained from Experimental Embodiments 1 to 4 of the invention are evidently lower than the RDC value in the Comparative Embodiment.

TABLE 3

| Number of Experimental Embodiment | PTA (°) | VHR (%) | RDC (mV) |
|---|---|---|---|
| Experimental Embodiment 1 (after) | 89 | 96 | 315 |
| Experimental Embodiment 2 (after) | 90 | 96 | 259 |
| Experimental Embodiment 3 (after) | 89 | 97 | 323 |
| Experimental Embodiment 4 (after) | 89 | 96 | 230 |
| Comparative Embodiment (after) | 89 | 92 | 680 |

In summary, physical processes are used in the present invention to remove the metal ion impurities and water contained in the polyamic acid resin or polyimide resin, so as to achieve effective purification. The purification method of the present invention also resolves the shortcomings of conventional methods which require large consumption of solvents and a great number of processes.

Although the application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:

1. A purification method of a polyamic acid resin, comprising:
   providing a polyamic acid resin solution containing metal ion impurities;
   performing a metal ion removal step, wherein a cation exchange resin is used to react with the polyamic acid resin solution to remove the metal ion impurities in the polyamic acid resin solution; and
   performing a water content removal step, so as to purify the polyamic acid resin solution by removing water content in the polyamic acid resin solution,
   wherein the metal ion removal step can be performed prior or later to the water content removal step in the order of sequence.

2. The purification method of the polyamic acid resin of claim 1, wherein a main chain of the cation exchange resin is selected from polystyrene, polydiphenylethylene, or a polymer formed by polymerization or crosslinking of silicone.

3. The purification method of the polyamic acid resin of claim 1, wherein the cation exchange resin comprises one of the following functional groups: a sulfone group, an amino salt group, an acidic group, a polyol group, or a urea group.

4. The purification method of the polyamic acid resin of claim 1, wherein a reaction flow rate of the metal ion removal step is between 10 and 300 L/h.

5. The purification method of the polyamic acid resin of claim 1, wherein a temperature of the metal ion removal step is between 0 and 75° C.

6. The purification method of the polyamic acid resin of claim 1, wherein a pressure of the metal ion removal step is between 0 and 10 kg/m2.

7. The purification method of the polyamic acid resin of claim 1, wherein a pH value of the metal ion removal step is between 4 and 10.

8. The purification method of the polyamic acid resin of claim 1, wherein the water content removal step comprises using a molecular sieve, celite, or aluminum oxide to remove the water content in the polyamic acid resin solution.

9. The purification method of the polyamic acid resin of claim 1, wherein the water content removal step comprises performing processes of evaporation, freeze sublimate, molecular sieve absorption, celite absorption, or aluminum oxide absorption on the polyamic acid resin solution.

10. The purification method of the polyamic acid resin of claim 1, wherein the water content removal step comprises performing a thin film evaporation on the polyamic acid resin solution.

11. The purification method of the polyamic acid resin of claim 1, wherein a reaction time of the water content removal step is between 4 and 12 hours.

12. The purification method of the polyamic acid resin of claim 1, wherein a temperature of the water content removal step is between −5 and 75° C.

13. The purification method of the polyamic acid resin of claim 1, wherein a pressure of the water content removal step is between 0.01 and 30 torr.

14. A purification method of polyimide resin, comprising:
providing a polyimide resin solution containing metal ion impurities;
performing a metal ion removal step, wherein a cation exchange resin is used to react with the polyimide resin solution to remove the metal ion impurities in the polyimide resin solution; and
performing a water content removal step, so as to purify the polyimide resin solution by removing water content in the polyimide resin solution,
wherein the metal ion removal step can be performed prior or later to the water content removal step in the order of sequence.

15. The purification method of the polyimide resin of claim 14, wherein a main chain of the cation exchange resin is selected from polystyrene, polydiphenylethylene, or a polymer formed by polymerization or crosslinking of silicone.

16. The purification method of the polyimide resin of claim 14, wherein the cation exchange resin comprises one of the following functional groups: a sulfone group, an amino salt group, an acidic group, a polyol group, or a urea group.

17. The purification method of the polyimide resin of claim 14, wherein a reaction flow rate of the metal ion removal step is between 10 and 300 L/h.

18. The purification method of the polyimide resin of claim 14, wherein a temperature of the metal ion removal step is between 0 and 75° C.

19. The purification method of the polyimide resin of claim 14, wherein a pH value of the metal ion removal step is between 4 and 10.

20. The purification method of the polyimide resin of claim 14, wherein the water content removal step comprises using a molecular sieve, celite, or aluminum oxide to remove the water content in the polyimide resin solution.

21. The purification method of the polyimide resin of claim 14, wherein the water content removal step comprises performing processes of evaporation, freeze sublimate, molecular sieve absorption, celite absorption, or aluminum oxide absorption on the polyimide resin solution.

22. The purification method of the polyimide resin of claim 14, wherein the water content removal step comprises performing thin film evaporation on the polyimide resin solution.

23. The purification method of the polyimide resin of claim 14, wherein a reaction time of the water content removal step is between 4 and 12 hours.

24. The purification method of the polyimide resin of claim 14, wherein a temperature of the water content removal step is between −5 and 75° C.

25. The purification method of the polyimide resin of claim 14, wherein a pressure of the water content removal step is between 0.01 and 30 torr.

\* \* \* \* \*